(12) United States Patent
Yoon et al.

(10) Patent No.: US 9,002,605 B2
(45) Date of Patent: Apr. 7, 2015

(54) CONTROL METHOD FOR VEHICLE WITH DCT

(71) Applicants: Hyundai Motor Company, Seoul (KR); Kia Motors Corp., Seoul (KR)

(72) Inventors: Young Min Yoon, Seoul (KR); Sung Hyun Cho, Suwon-si (KR); Joung Chul Kim, Suwon-si (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 4 days.

(21) Appl. No.: 13/718,367

(22) Filed: Dec. 18, 2012

(65) Prior Publication Data
US 2014/0121925 A1    May 1, 2014

(30) Foreign Application Priority Data

Oct. 25, 2012   (KR) .................. 10-2012-0119270

(51) Int. Cl.
*G06F 7/00*    (2006.01)
*B60W 10/02*    (2006.01)

(52) U.S. Cl.
CPC ..................................... *B60W 10/02* (2013.01)

(58) Field of Classification Search
CPC ....................................................... B60W 10/02
USPC .......................................................... 701/68
See application file for complete search history.

(56) References Cited

U.S. PATENT DOCUMENTS

| | | | | |
|---|---|---|---|---|
| 5,004,082 | A | * | 4/1991 | Sakakibara et al. ......... 192/3.26 |
| 5,024,638 | A | * | 6/1991 | Sakakibara et al. .......... 475/210 |
| 5,186,066 | A | * | 2/1993 | Pankratz et al. ................ 74/335 |
| 6,869,382 | B2 | * | 3/2005 | Leising et al. ................... 477/77 |
| 7,155,993 | B2 | * | 1/2007 | Koenig et al. .................... 74/331 |
| 7,757,577 | B2 | * | 7/2010 | Kawamoto et al. ............. 74/335 |
| 2009/0223317 | A1 | * | 9/2009 | Annear ....................... 74/473.24 |
| 2010/0184561 | A1 | | 7/2010 | Schaarschmidt et al. |
| 2010/0186532 | A1 | * | 7/2010 | Stefina ....................... 74/473.24 |

FOREIGN PATENT DOCUMENTS

| | | |
|---|---|---|
| JP | 2010-255855 A | 11/2010 |
| KR | 10-2011-0105636 A | 9/2011 |
| KR | 10-2011-0109022 A | 10/2011 |

* cited by examiner

*Primary Examiner* — James Trammell
*Assistant Examiner* — Majdi Alsomiri
(74) *Attorney, Agent, or Firm* — Morgan, Lewis & Bockius LLP

(57) ABSTRACT

Slipping of a clutch can be minimized with a method of controlling the clutch different, depending on the current traveling status of the vehicle, when reaccelerating the vehicle with both clutches open before stopping the vehicle with a dual clutch transmission (DCT). The method can improve the sense of shifting by optimizing the inclination of an engine speed.

4 Claims, 4 Drawing Sheets

CONTROL METHOD FOR VEHICLE WITH DCT

CROSS-REFERENCE TO RELATED APPLICATION

The present application claims priority of Korean Patent Application Number 10-2012-0119270 filed Oct. 25, 2012, the entire contents of which application is incorporated herein for all purposes by this reference.

BACKGROUND OF INVENTION

1. Field of Invention

The present invention relates to a control method for a vehicle with a dual clutch transmission (DCT), and more particularly, to a method of controlling a vehicle, when there is a request for reacceleration with a clutch open, before the vehicle stops.

2. Description of Related Art

In vehicles with a dual clutch transmission (DCT) that uses not a torque converter, but a clutch, as a starting device, the clutch is opened to preclude a shock due to stall of the engine before stopping and a change of directionality of engine torque.

In this configuration, when a driver presses down the acceleration pedal to accelerate the vehicle again, it is necessary to reaccelerate the vehicle by controlling slip of the clutch of an input shaft (hereafter, a target shaft) that a target shift gear determined on the basis of the current traveling status of the vehicle pertains to. Such starting control is, as illustrated in FIG. 1, is a type of controlling a clutch in consideration of engine torque such that an engine speed satisfies an engine target speed, by appropriately setting the engine target speed in accordance with the traveling status of a vehicle.

However, when the starting control is performed under the condition that the clutch speed of the target shaft is higher than the current engine speed, the inertia of the input shaft is smaller than the inertia of the engine, with the engine speed and the speed of the target shaft crossing each other, so that a shock may be generated in engaging the clutch, and the higher the target shift gear, the more the durability of the clutch may decrease due to excessive slip.

For reference, in FIG. 1, the target shaft is an input shaft where the first clutch is connected and the clutch is disposed between an engine and the input shaft for the structure, but the rotational speed of the first clutch is represented as the same meaning as the rotational speed of the input shaft, which is the target shaft, inferring from that the clutch integrally rotates with the input shaft for the convenience.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to solve the above-described problems associated with prior art.

Various aspects of the present invention provide for a control method for a vehicle with a dual clutch transmission (DCT) which can minimize slip of a clutch by making the method of controlling the clutch different, depending on the current traveling status of the vehicle, when reaccelerating the vehicle with both clutches open before stopping the vehicle with DCT, and can improve the sense of shifting by optimizing the inclination of an engine speed.

Various aspects of the present invention provide for a control method for a vehicle with a DCT includes: a reacceleration-determining step for determining whether there is request for reacceleration from a driver with both clutch open; and a speed-considering step for changing a clutch of a target shaft, which is an input shaft that a target shift gear determined in accordance with the current traveling speed of the vehicle, in accordance with the level of the current engine speed and the speed of input shafts where the two clutches are connected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
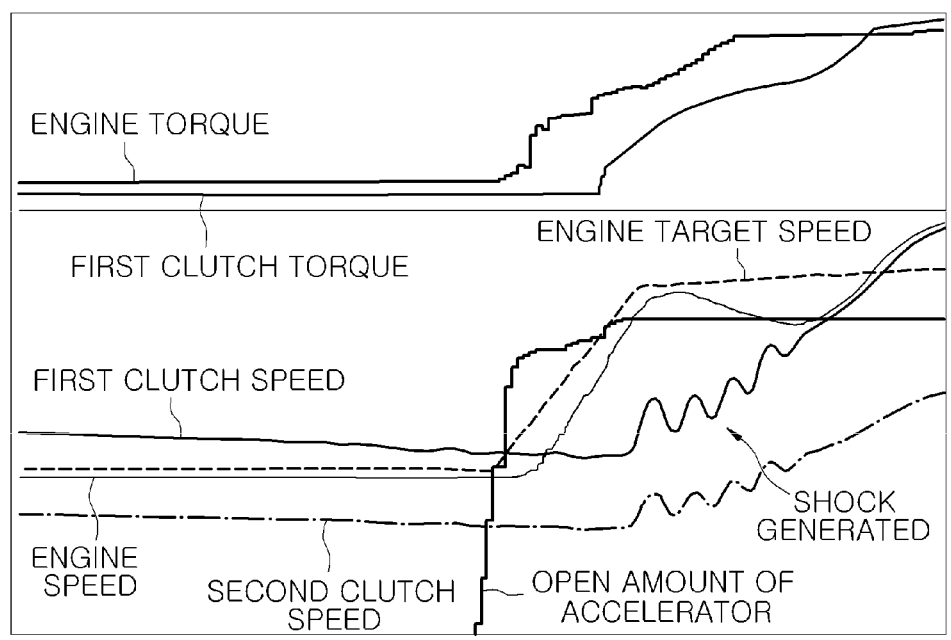
FIG. 1 is a diagram showing a control method for a vehicle with a dual clutch transmission (DCT) according to the related art and illustrating an example of starting control.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
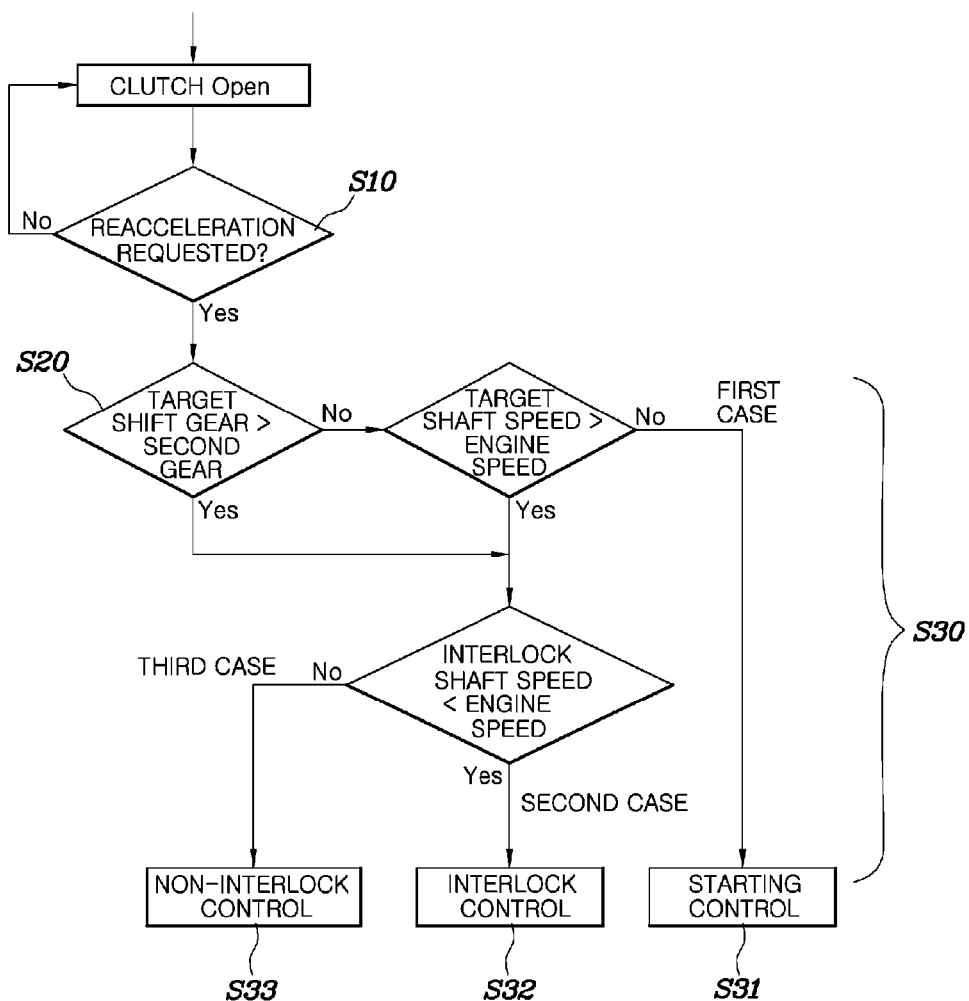
FIG. 2 is a flowchart illustrating an exemplary control method for a vehicle with a DCT according to the present invention.

Referring to FIG. 2, a control method for a vehicle with a dual clutch transmission (DCT) according to various embodiments of the present invention includes: a reacceleration-determining step (S10) for determining whether there is request for reacceleration from a driver with both clutch open; and a speed-considering step (S30) for changing a clutch of a target shaft, which is an input shaft that a target shift gear determined in accordance with the current traveling speed of the vehicle, in accordance with the level of the current engine speed and the speed of input shafts where the two clutches are connected.

That is, according to the present invention, it is possible to improve the sense of shifting by optimizing the inclination of an engine speed to reduce a shock in engaging the clutch and to improve durability of the clutch by minimizing clutch slip, when a driver intends to reaccelerate a vehicle by pressing down an acceleration pedal with both clutches open before the vehicle decelerates and stops, by sensing the intention in the reacceleration-determining step (S10) and comparing the speeds of the engine speed and two input shafts at that time and implementing the processes from engaging the clutch of a target shaft to reaccelerating the vehicle with a different way, respectively.

The speed-considering step (S30) compares the current engine speed with the speed of the target shaft and defines the first case where the engine speed is the speed of the target shaft or more, a second case where the engine speed is less than the speed of the target shaft and is larger than the speed of an interlock shaft that is the other one input shaft than the target shaft, and the third case where the engine speed is less than the speed of the target shaft and the speed of the interlock shaft.

That is, the first case with the engine speed higher than the speed of the target shaft, the second case with the speed of the target shaft larger than the speed of the interlock shaft and the engine speed between the speed of the target shaft and the speed of the interlock shaft, and the third case with engine speed smaller than both the speed of the target shaft and the speed of the interlock shaft are defined.

In the first case, a starting control process (S31), which sets an engine target speed in accordance with the traveling status of a vehicle and controls and engages the clutch of the target shaft in consideration of engine torque such that the engine speed satisfies the engine target speed, is performed.

That is, when the engine speed is the speed of the target shaft or more, the clutch of the target shaft is engaged by performing starting control in the same way as that of the related art.

In the second case, an interlock control process (S32), which operates the clutch of the target shaft and the clutch of the interlock shaft to be engaged until the engine speed reaches the speed of the target shaft, and then finishes engaging the clutch of the target shaft by means of handover, is performed.

Figure 3:
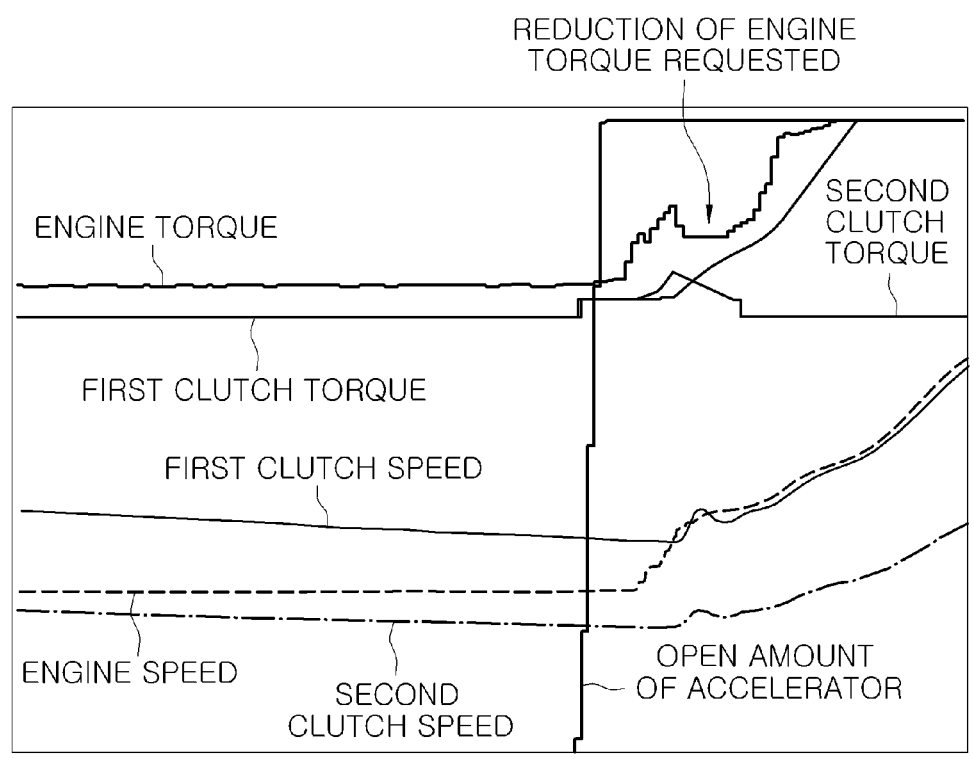
FIG. 3 is a diagram illustrating an exemplary interlock control process in a control method for a vehicle with a DCT according to the present invention.

That is, as illustrated in FIG. 3, when the engine speed is at an intermediate position where it is lower than the speed of the target shaft and higher than the speed of the interlock shaft, a process of forming an interlock status, where both clutches are subsequently engaged with the engine, is performed by operating the clutch of the interlock shaft to be engaged too simultaneously with engaging the clutch of the target shaft, which prevents the engine speed from rapidly increasing by engaging the clutch of the interlock shaft and controls the rising inclination to be smooth, thereby consequently preventing a shock.

The clutch of the target shaft is finished being engaged by means of handover that disengages the clutch of the interlock and engages the clutch of the target shaft, after the engine speed reaches the speed of the target shaft while an interlock status is formed by engaging both clutches; therefore, it is possible to effectively reduce a shifting shock that is generated by the operation in the related art and more effectively reduce the shifting shock by performing engine cooperation control that requests to reduce torque of the engine from when the engine speed approaches the speed of the target shaft to when the clutch is finished being engaged.

For reference, the clutch of a target shaft is shown as a first clutch and the clutch of an interlock shaft is shown as a second clutch.

Figure 4:
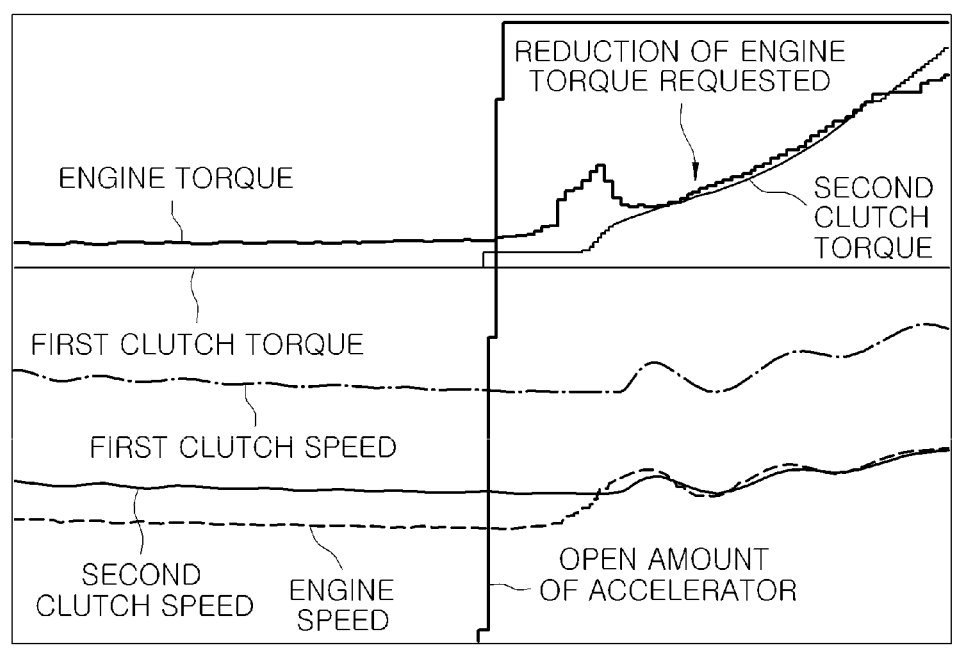
FIG. 4 is a diagram illustrating an exemplary non-interlock control process in a control method for a vehicle with a DCT according to the present invention.

In the third case, as illustrated in FIG. 4, a non-interlock control process (S33) that engages the clutch of the target shaft while controlling the engine speed in accordance with the speed of the target shaft is performed. For reference, the clutch of a target shaft is shown as a second clutch in FIG. 4.

That is, with the engine speed lower than both the speed of the target shaft and the speed of the interlock shaft, a shifting shock can be effectively reduced by, unlike the starting control, controlling the engine speed in accordance with the speed of the target shaft and performing engine cooperation control for requesting to reduce torque of the engine from when the engine speed approaches the speed of the target shaft to when the clutch is finished being engaged.

As described above, in the interlock control process (S32) and the non-interlock control process (S33), engine cooperation control for requesting to reduce torque of the engine is performed from when the engine speed approaches the speed of the target shaft by 90% or more to when the clutch is finished being engaged.

Meanwhile, prior to the speed-considering process (S30), a target shift gear-determining step (S20) that determines whether a target shift gear is the third or higher shift gear is further included, and it is determined whether it is the first case, when the shift gear is not the third or higher shift gear, as the result of performing the target shift gear-determining step (S20), and it is determined whether it is the second case or the third case, when the shift gear is the third or higher shift gear.

That is, when the starting control process (S31) is performed with the target shift gear at the third or higher shift gear, a slip time is so long that, to avoid this, it is not determined whether it is the first case, but basically whether it is the second case or the third case, when the target shift gear is the third or higher shift gear so that a clutch is engaged by the interlock control process (S32) or the non-interlock control process (S33).

When the shift gear is not the third or higher shift gear, as the result of the target shift gear-determining step (S20), whether it is the first case is determined, and as the result, when it is the first case, the starting control process (S31) is obviously performed, and when it is not the first case, whether it is the second case or the third case is also determined so that the interlock control process (S32) or the non-interlock control process (S33) can be performed.

As described above, according to the present invention, when there is a request for reacceleration from a driver, with both clutches open, it is possible to minimize slip of the clutches and improve the sense of shifting by optimizing the inclination of the engine speed, by changing the process of finishing engaging of the clutch of an input shaft that a target shift gear pertains to, in accordance with the level of the target shaft determined in accordance with the current vehicle speed, and the level between the current engine speed and the angular speeds of two input shaft.

The present invention can minimize slip of a clutch by making the method of controlling the clutch different, depending on the current traveling status of the vehicle, when reaccelerating the vehicle with both clutches open before stopping the vehicle with DCT, and can improve the sense of shifting by optimizing the inclination of an engine speed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method for a vehicle with a dual clutch transmission (DCT), comprising:
   a reacceleration-determining step for determining whether there is request for reacceleration of the vehicle from a driver with two clutches being open before the vehicle decelerates and stops; and
   a speed-considering step for following a different coupling process in a clutch of a target shaft, in accordance with a level of a current engine speed and speeds of input shafts to which the two clutches are connected respectively, when it is determined that there is the request for the reacceleration of the vehicle;
   wherein the target shaft is an input shaft whose a target shift gear is determined in accordance with the current traveling speed of the vehicle,
   wherein the speed-considering step compares a current engine speed with a speed of the target shaft and categorizes the coupling process as a first case where the current engine speed is the speed of the target shaft or more, a second case where the current engine speed is less than the speed of the target shaft and is larger than a speed of an interlock shaft, and a third case where the engine speed is less than the speed of the target shaft and the speed of the interlock shaft, and wherein in the first case, a starting control process sets an engine target speed in accordance with the traveling status of a vehicle and controls and engages the clutch of the target shaft based upon engine torque such that the engine speed satisfies the engine target speed, in the second case, an interlock control process operates the clutch of the target shaft and the clutch of the interlock shaft to be engaged until the engine speed reaches the speed of the target shaft, and then finishes engaging the clutch of the target shaft by means of handover, and in the third case, a non-interlock control process engages the clutch of the target shaft while controlling the engine speed in accordance with the speed of the target shaft.

2. The method of claim 1, wherein in the interlock control process and the non-interlock control process, engine cooperation control for requesting to reduce torque of the engine is performed from when the engine speed approaches the speed of the target shaft by 90% or more to when the clutch is finished being engaged.

3. The method of claim 1, wherein prior to the speed-considering process, a target shift gear-determining step that determines whether a target shift gear is the third or more shift gear is further included, and it is determined whether it is the first case, when the shift gear is not the third or more shift gear, as the result of performing the target shift gear-determining step, and it is determined whether it is the second case or the third case, when the shift gear is the third or more shift gear.

4. The method of claim 3, wherein when the shift gear is not the third or higher shift gear, as the result of the target shift gear-determining step, whether it is the second case or the third case is determined.

* * * * *